United States Patent [19]

Hamada et al.

[11] Patent Number: 4,771,302
[45] Date of Patent: Sep. 13, 1988

[54] CAMERA WITH ORIENTABLE TAKING LENS AND A DEVICE FOR ATTACHING A FLASH UNIT

[75] Inventors: Hisashi Hamada, Tokyo; Katsuhiko Yamamoto, Saitama; Takeshi Yoshino, Saitama; Masayoshi Hirai, Saitama; Shiro Hashimoto, Saitama; Michihiro Shiina, Saitama; Shigenori Goto, Saitama, all of Japan

[73] Assignee: Fuji Photo Film Co., Ltd., Kanagawa, Japan

[21] Appl. No.: 920,052

[22] Filed: Oct. 20, 1986

[30] Foreign Application Priority Data

Oct. 20, 1985 [JP] Japan .................. 60-160024[U]

[51] Int. Cl.⁴ .................. G03B 15/05; G03B 5/06
[52] U.S. Cl. .................. 354/145.1; 354/126; 354/189; 362/3
[58] Field of Search .................. 354/126, 145.1, 149.1, 354/149.11, 189, 190, 191, 193, 187; 362/3, 11

[56] References Cited

U.S. PATENT DOCUMENTS

| | | | |
|---|---|---|---|
| 3,825,938 | 7/1974 | Koch | 354/187 |
| 4,030,114 | 6/1977 | Telfer | 362/3 |
| 4,392,183 | 7/1983 | Ostlund et al. | 362/11 |

FOREIGN PATENT DOCUMENTS 2087592A  5/1982  United Kingdom .............. 354/126

Primary Examiner—A. A. Mathews
Attorney, Agent, or Firm—Young & Thompson

[57] ABSTRACT

A camera of the type in which a taking lens is orientable relative to the camera body comprises a lens holder, a light-impervious member connecting the lens holder and camera body for allowing at least an axial movement of the taking lens, and a supporting member attached to the lens holder for detachably connecting a flash unit.

4 Claims, 3 Drawing Sheets

CAMERA WITH ORIENTABLE TAKING LENS AND A DEVICE FOR ATTACHING A FLASH UNIT

BACKGROUND OF THE INVENTION

The present invention relates to a device for attaching a flash unit to a camera of the type which has a taking lens that can be oriented relative to the camera body.

In still photography, there are various cameras of the type having means holding a lens in a position relative to the camera body. Good examples of this type are cameras whose lens holding means and camera body are telescopically connected, for example by a barrel, so that they can be moved axially relative to each other for changing the focal length of the taking lens, and camera whose lens holding means and camera body are flexibly connected, for example by a bellows, so that they can be moved independently of one another. This latter type of camera, which is often used in studios for commercial photography, permits various movements of the lens relative to the camera body: a forward and rearward movement to adjust focus, a vertical movement called a rise or a fall, a lateral movement called a shift, a pivotal movement called swing when about a vertical axis and tilt when about a horizontal axis. These lens movements make it possible to take photographs of objects either straight on, or from any desired angle.

The conventional cameras of the above-described type are adapted to receive a detachable electronic or strobe-type flash unit on the camera body by means of a hot shoe when making film exposures where artificial supplemental illumination is needed. While these flash units work well, the camera has the problem that, although the lens holding means can be changed in orientation, it is impossible to direct illumination provided by the flash unit attached to the camera body in exactly the same direction as that in which the lens holding means is facing. This non-alignment causes a directional discrepancy between the optical axis of the taking lens and the illumination axis of the flash unit and, additionally, part of the illumination provided by the flash unit is often shielded by the lens holding means, depending on its orientation.

In order to prevent this directional discrepancy and shielding problem, it has been necessary to make either the flash unit itself or its flash output head independently orientable so as to direct full illumination to a principal subject at which the taking lens is aimed, and this without any shielding of the illumination. However, this makes the flash unit complicated, bulky and costly.

OBJECT OF THE INVENTION

It is therefore an object of the present invention to proide a camera of the above-described type which permits using conventional flash units having a stationary flash output head.

It is another object of the present invention to provide a camera in which directional adjustment of a flash unit attached thereto is unnecessary, even though the lens holding means is orientable relative to the camera body.

It is still another object of the present invention to provide a camera having means permitting easily removing and attaching flash units.

SUMMARY OF THE INVENTION

The present invention is directed to an improved flash unit attaching device for a camera of the type having a camera body, means for holding a taking lens, means for flexibly or telescopically connecting the holding means and the camera body to each other in a light-impervious fashion that allows at least a relative movement therebetween, and means fixedly mounted on the holding means for removably attaching a flash unit to the camera.

According to an important feature of the present invention a flash unit can be fixedly attached to the lens holding means such as a lens board so as always to direct illumination provided thereby in the same direction as the optical axis of the taking lens. Therefore, there is no directional discrepancy between the taking lens and the flash unit and no shielding of illumination from the flash unit by the lens holder even when the lens holder is given any orientation relative to the camera body.

BRIEF DESCRIPTION OF THE DRAWING

The invention will now be described in greater detail and by way of example, in the following detailed description taken in conjunction with the accompanying drawings, wherein.

DETAILED DESCRIPTION OF THE INVENTION

Figure 1:
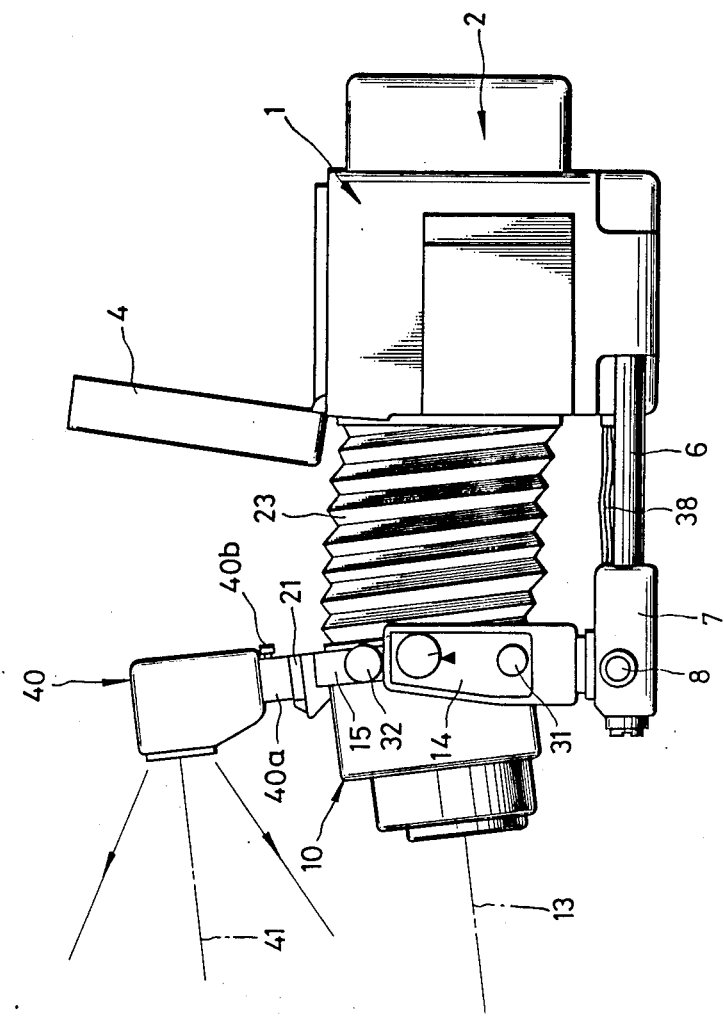
FIG. 1 is a schematic side view of the camera embodying the present invention showing the flash unit in its operational position for illuminating an object to be photographed.
Figure 2:
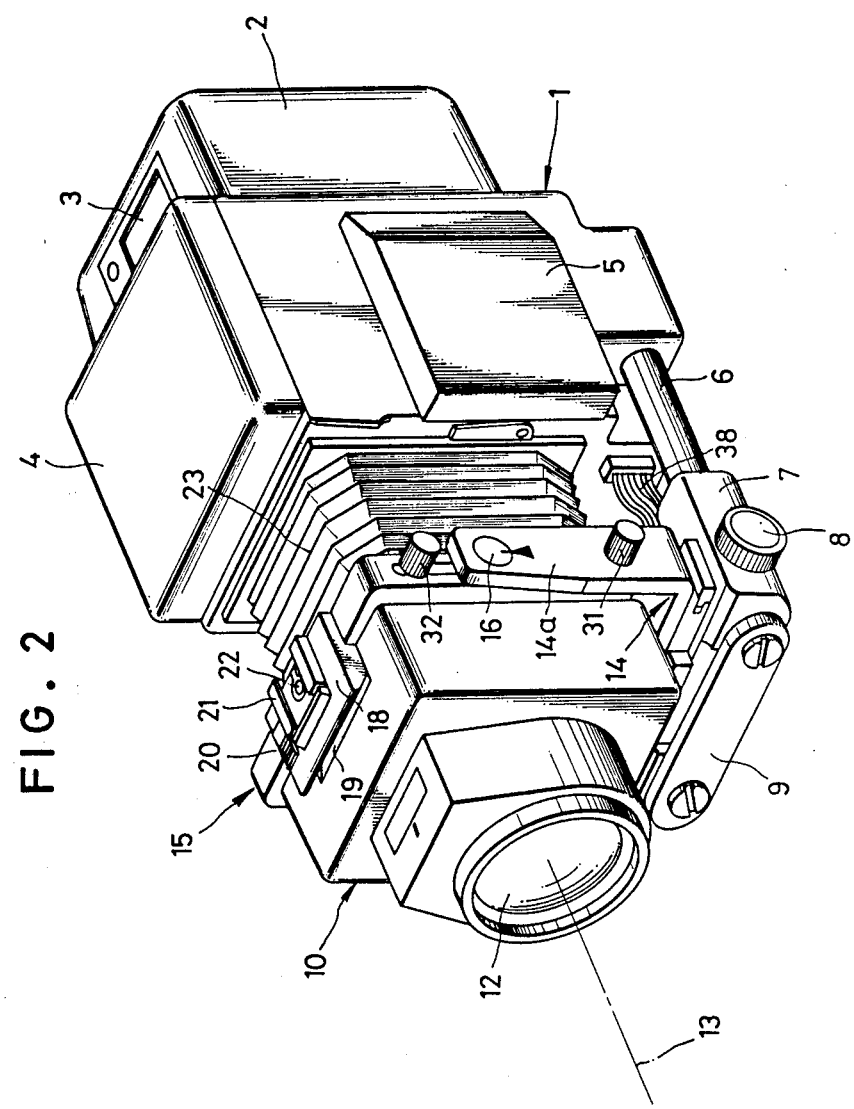
FIG. 2 is an enlarged perspective view of the camera of FIG. 1.

Referring now to FIGS. 1 and 2, a camera embodying the present invention includes a film magazine 2 detachably mounted on the camera body 1 at the rear end. Inside the film magazine 2 there is incorporated an automatic film winding mechanism well known in the art, which is adapted to wind the film responsive to a signal generated on the camera body side. A liquid crystal display panel 3 is provided on the top of the film magazine 2 selectively to indicate film advancing conditions, the number of exposures, etc.

A finder hood 4 is hinged to the top of the camera body 1, in order to expose or cover a focusing screen disposed inside the camera body 1. The focusing screen permits viewing an image formed on the focusing screen for adjusting focus and framing in a well known manner. On the left hand side of the camera body 1, a battery unit 5 is detachably mounted and serves as an electric power source for the entire camera. A reflection mirror of a quick-return type and a mirror driving mechanism are also provided inside the camera body 1. These latter elements, like the focusing screen, are not shown in the drawings, they being well-known in the art. A pair of cylindrical rails 6 extends forward horizontally from the bottom of the camera body 1.

A transverse, sliding support 7 is mounted on the cylindrical rails 6 and movably cooperates therewith through engagement between a pinion built in the sliding support 7 and a rack on one of the rails 6 for back and forth movement along the rails 6. An adjusting knob 8 rigidly coupled to the pinion is rotatably mounted on the transverse sliding support 7. By rotating the adjusting knob 8, the sliding support 7 can be moved backward or forward to a desired position. Fixed to the ends of the cylinder rails 6 is a transverse plate 9 for preventing the sliding support 7 from coming off the rails 6. The plate 9 may be given an ornamental appearance.

A front standard 14 is mounted on the sliding support 7 for pivotal movement about an axis perpendicular to the optical axis 13 of the taking lens 12. The front standard 14 is U-shaped and comprises a pair of upright arms 14a, each of which supports an axle 16a (see FIG. 3) having at its outer end an index disk 16 integrated with arm 14a and exteriorly exposed. The inner end of each axle 16a is rigidly fixed to a lens holder 15, and the lens holder 15 can thus rotate about the axles 16a, that is, the lens holder 15 can tilt. The index disk 16 thus turns relative to standard 14 to indicate the tilt angle of the lens holder 15. A clasp 18 is provided on the top surface of the lens holder 15 for engaging an inner side wall of a recess 19 formed on top of an interchangeable lens unit 10, so as firmly to mount the lens unit 10. The clasp 18 is adapted to disengage when a locking slide 20 is moved, to permit interchanging the lens unit 10 in the lens holder 15.

On top of the lens holder 15 or the clasps 18, an accessory shoe or hot shoe 21 is disposed for removably attaching a fixed-head electronic or strobe-type flash unit 40 (referred to hereinafter as a flash unit) to the lens holder 15, and hence to the lens unit 10. The flash unit 40 is thus continuously aligned with the focal axis of the lens unit 10, wherever the lens is directed. There is a flash synchro contact 22 well known in the art, disposed in the hot shoe 21 for transmitting a synchro signal from the camera to the flash unit 40.

The lens unit 10 includes at least a shutter with a built-in diaphragm as well as a taking lens 12. The shutter and diaphragm are set to selected values by operating adjusting levers or rings mounted on the lens 12 in any well-known manner. The lens holder 15 and the camera body 1 are flexibly connected, for independent movement relative to one another, by a bellows 23 which is detachable from the camera body 1 and lens holder 15.

Figure 3:
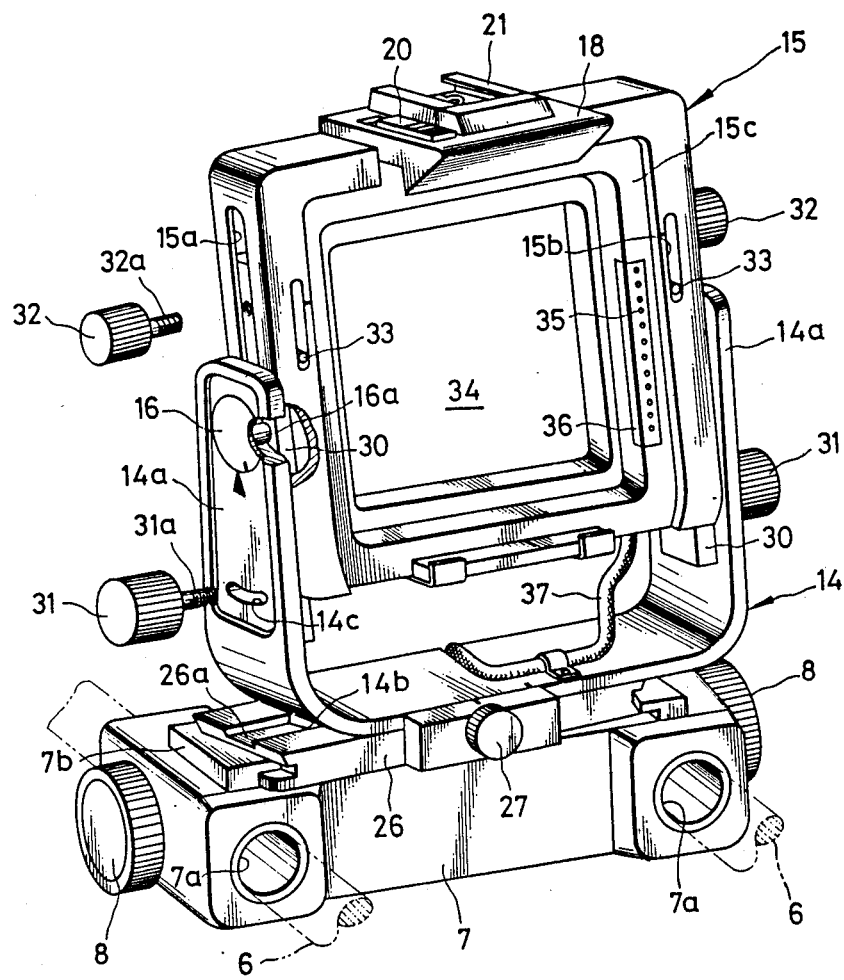
FIG. 3 is an enlarged perspective view, shown partly exploded of the lens orientation mechanism for the camera of FIGS. 1 and 2.

Referring now to FIG. 3, there is shown a mechanism for allowing all the previously-discussed camera movements, namely, back and forth movement, rise or a fall, shift, swing and tilt. The sliding support 7 is formed with a pair of holes 7a through which the cylindrical rails 6 extend. Provided on the top of the sliding support 7 is a pviot base 7b to which a shift base 26 is pivotally mounted. As the front standard 14 is supported by the pivot base 7b for pivotal movement, the standard 14 is pivotable relative to the sliding support 7, allowing the lens holder 15 and hence lens unit 10 to pivot. The shift base 26 is formed with a bevelled groove 26a in which a slide 14b formed at the bottom of the front standard 14 is slidably received for side-to-side shifting movement. However, this shifting of the front standard 14 is limited to a certain range by means of, for example, stop pins.

A clamping knob 27 is provided in connection with the shift base 26 for clamping the standard 14 at any shifted position in a well known manner. The pivoting of the shift base 26 is also limited to a certain range by means of, for example, stop pins.

Each axle 16a extends into the inside of the lens holder 15, passing through a vertical slot 15a of the lens holder 15. The inside end of each axle 16a is connected to a shift column 30 inside the lens holder 15. The axle-slot engagement allows the lens holder 15 to turn about the axles 16a, causing a tilting of the lens unit 10. Near the bottom of each arm 14a is a slot 14c describing an arc of a circle whose center is at the axle 16a, and through which slot a clamping screw 31a of a clamping knob 31 extends. The clamping screw 31a is retained by a threaded hole (not shown) formed in each shift column 30. Loosening clamping screw 31a permits the lens holder 15 to tilt, and tightening the clamping screw 31a fixes the lens holder 15 at a tilted position.

At the top of each column 30, the clamping screw 32a of a clamping knob 32 is retained by a threaded hole formed in each column 30. Loosening the clamping screw 32a permits the lens holder 15 to be raised or lowered, the column 30 serving as a guide. Tightening the clamping screw 32a holder the lens holder 15 at a selected vertical position. On the front of each column 30 there is provided an index pin 33 extending in a vertical slot 15b formed in the front wall of the lens holder 15. The position of pin 33 relative to slot 15b indicates the vertical position of the lens holder 15. The opening 34 in the lens holder 15 allows light from the taking lens 12 to pass into the bellows 23.

A mounting flange 15c is formed in the front face of lens holder 15 for mounting the lens unit 10. Along one side of the mounting flange 15c there is a plate 36 comprising a column of electric contacts 35 which are positioned corresponding to various signal pins (not shown) provided on the mating surface of the lens unit 10 and which transmit signals between the lens unit 10 and the camera body 1. The hot shoe 22 is connected to one of the contacts 35 to receive a synchro signal from the lens unit 10. The contacts 35 are connected to the camera body 1 through a signal cord 37, a connector (not shown) and a flat cable 38 (see FIG. 1) so as to transmit signals between the camera body 1 and the shutter in the lens unit 10 for actuating the shutter. Signals indicative of the shutter speed and diaphragm size selected at the lens unit 10 are thereby transmitted from lens unit 10 to the camera body 1.

Referring again to FIG. 1, there is shown the camera ready for flash photography. When flash lighting is required, a hot shoe connector 40a of the flash unit 40 is inserted into the hot shoe 21 and is fastened thereto by tightening a clamping lever 40b. Since the flash unit 40 is electrically coupled to the shutter by means of the flash synchro contact 22 (FIG. 2), it is triggered to generate a flash of light responsive to a synchro signal produced by operating the shutter. As described above, because the flash unit 40 is coupled to the lens holder 15, the flash unit 40 is continuously aligned with the optical axis 13 of the lens 12. If a parallax results from the distance between the axes 12 and 41 of the lens 12 and the flash unit 40, respectively, relative to the distance of the subject from the lens, it can be corrected by tilting the flash output head of the flash unit correspondingly.

The lens unit can be oriented as follows:

For shifting the lens unit 10 side to side, the front standard 14 is slid to one side or the other on the shift base 26, after having loosened the shift clamping knob 27. At a desired position, the front standard 14 is fixed by tightening the shift clamping knob 27 to place the lens holder 15, and hence the lens unit 10, in the desired shift position. For the swing movement of the lens unit 10, the shift base 26 is pivoted relative to the pivot base 7b. As was previously described, the pivot base 26 pivots about a horizontal axis. As a result, the lens holder 15 and the lens unit 10 are pivoted, together with the front standard 14 fixed to the shift base 26, for a swing movement. Friction between the pivot base 7b and shift base 26 maintains the pivoted assembly at the desired angular position. For tilting the lens unit 10, the clamping knobs 31 are loosened so as to allow the lens holder 15 to be tilted about the axles 16a. After having tilted the lens holder 15 to a desired angle relative to the front standard 14, the clamping knobs 31 are tightened to secure the tilted position of the lens unit 10. For raising or lowering the lens unit 10, the lens holder 15 is slid up or down along the pair of columns 30 after having loosened the clamping knobs 32. The vertical position of lens holder 15 being indicated by the position of the index pins 33 relative to the lens holder 15, the lens holder is clamped at a desired vertical position by tightening the clamping knobs 32. For adjusting focus, the adjusting knobs 8 are loosened to allow the sliding support 7 to be moved back or forth along the cylindrical rails 6.

Because each of the above-mentioned camera movements can be effected independently, the lens 12 can face in any possible direction according to advantageous combinations of the various possible movements. It is desirable for the camera orientation mechanism to make it easy to restore the lens unit 10 to its normal position, because the inclination of the optical axis 13 of the lens 12 has a direct and critical effect upon forming an image.

According to the present invention, since the camera is provided with a hot shoe for attaching a flash unit to a lens holder that is orientable relative to the camera body, the flash unit's illumination axis is always maintained in a predetermined relationship to the axis of the taking lens mounted on the lens holder, no matter how the taking lens is oriented. Therefore, the camera not only permits using any conventional flash unit with a fixed flash output head, but also obviates any operations of changing the direction of the flash unit or flash output head.

A particular embodiment of the invention has been described by way of example only: it will be understood the invention is applicable to cameras which have a lens holding means that can be oriented relative to its camera body, and that it is intended to cover all changes and modifications of the present embodiment apparent to those skilled in the art without departing from the spirit and scope of the invention.

What is claimed is:

1. A camera of the type having a taking lens that can be moved relative to a camera body, comprising:
   a camera body adapted to receive a photographic film;
   a taking lens having an optical axis;
   means rigidly holding said taking lens;
   means interconnecting said lens holding means and said camera body in a light-impervious manner, said lens holding means being movable relative to said camera body;
   means for supporting a detachable flash unit on said lens holding means; whereby a said flash unit so connected assumes a constant orientation relative to said taking lens;
   said interconnecting means comprising a bellows of a flexible resilient material;
   a pair of parallel guide rails extending from said camera body parallel to said focal axis; a transverse support mounted for sliding movement on said pair of guide rails; and
   a U-shaped standard comprising a pair of substantially vertical arms, said standard being mounted on said transverse support for pivotal movement about a vertical axis substantially perpendicular to said focal axis and shifting movement along a first horizontal axis substantially perpendicular to said optical axis;
   said lens holding means being mounted between said arms of said standard for tilting movement about a second horizontal axis substantially parallel to said first horizontal axis.

2. A camera of the type having a taking lens that can be moved relative to a camera body, comprising:
   a camera body adapted to receive a photographic film;
   a taking lens having an optical axis;
   means rigidly holding said taking lens;
   means interconnecting said lens holding means and said camera body in a light-impervious manner, said lens holding means being movable relative to said camera body about a horizontal axis perpendicular to said optical axis; and
   means for rigidly supporting a detachable flash unit on said lens holding means against swinging movement relative to said lens holding means, whereby a said flash unit so connected assumes a constant orientation relative to said taking lens.

3. Camera according to claim 2, in which said supporting means comprises a hot shoe on said lens holding means.

4. A camera of the type having a taking lens that can be moved relative to a camera body, comprising:
   a camera body adapted to receive a photographic film;
   a taking lens having an optical axis;
   means rigidly holding said taking lens;
   means interconnecting said lens holding means and said camera body in a light-impervious manner, said lens holding means being movable relative to said camera body about a horizontal axis perpendicular to said optical axis; and
   a hot shoe fixedly secured on said lens holding means for detachably supporting a flash unit directly on said lens holding means, whereby a said flash unit so connected assumes a constant orientation relative to said taking lens.

* * * * *